(12) United States Patent
Bodin et al.

(10) Patent No.: US 7,305,482 B2
(45) Date of Patent: *Dec. 4, 2007

(54) ASSIGNABLE DIRECTOR AUTHORITY FOR CONTROL OF STREAMING DIGITAL CONTENT

(75) Inventors: William Kress Bodin, Austin, TX (US); Derral Charles Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1040 days.

This patent is subject to a terminal disclaimer.

(21) Appl. No.: 09/882,173

(22) Filed: Jun. 14, 2001

(65) Prior Publication Data

US 2003/0009575 A1    Jan. 9, 2003

(51) Int. Cl.
*G06F 15/16* (2006.01)
*G06F 15/167* (2006.01)
*G06F 15/00* (2006.01)

(52) U.S. Cl. .............. 709/231; 709/203; 709/219; 715/513

(58) Field of Classification Search ........ 709/217–235, 709/201–205, 200–203; 715/513, 752; 725/112; 718/100; 719/310–318, 330; 717/100–104; 379/265.09
See application file for complete search history.

(56) References Cited

U.S. PATENT DOCUMENTS

2002/0087655 A1 * 7/2002 Bridgman et al.

OTHER PUBLICATIONS

Java Media Framework API Guide, JMF 2.0 FCS, Nov. 19, 1999, Sun Microsystems, pp. 1-66, 109-135, 173-178.*
Application Server Solution Guide, Enterprise Edition: Getting Started, Nusbaum, May 2000, Nusbaum et. al., pp. 1-45; 416 434.*

* cited by examiner

*Primary Examiner*—Haresh Patel
(74) *Attorney, Agent, or Firm*—John Biggers; Justin Dillon; Biggers & Ohanion, LLP (57) ABSTRACT

Assigning director authority in a system that streams digital content from a multiplicity of sources of digital information to a multiplicity of client devices under control of a multiplicity of directors, the method implemented in conjunction with a network of digital computers, at least one of the digital computers comprising a content server upon which the steps of the method are implemented in computer memory and upon at least one computer processor, each director having director attributes, the content server including a store of director instruction records wherein each director instruction record represents one director instruction, including extracting for a director, in dependence upon the director's attributes, director instructions from the store of director instruction records and downloading the extracted director instructions to the director.

30 Claims, 8 Drawing Sheets

ASSIGNABLE DIRECTOR AUTHORITY FOR CONTROL OF STREAMING DIGITAL CONTENT

BACKGROUND OF THE INVENTION

1. Field of the Invention

The field of the invention is data processing, or, more specifically, methods, systems, and products for assignable director authority for streaming digital content.

2. Description of the Related Art

Streaming digital content delivered to users via networks is a powerful way of delivery substantive content of entertainment, education, and business communications to users. In the current state of the art, however, the users themselves are required to control presentations of streaming digital content. Many prior art implementations of streaming video and audio, including for example, RealPlayer™ from RealNetworks, Inc., of Seattle, Wash., Apple's QuickTime™, and Microsoft's Windows Media Player, actually require user to have some kind of video viewer application open in order to control video streaming. User controls are simple, including the analogues for the controls found on VHS videotape recorders, Play, Pause, Stop, and the like. During playback of a clip in such prior art devices, no director control is provided on the server side of the stream of digital content. Most prior art systems for formulating presentation of streaming digital content are oriented to formulating playback of clips recorded prior to their presentation over a network. To the extent that control systems exist for formulation and control of digitized output streams of live video and audio, such controls are expensive and specialized, typically requiring direct connection to particular servers, workstations, or other computers. There remains in the art therefore, a need for convenient, powerful, flexible, means of formulating and controlling streaming digital content.

SUMMARY

In summary, this specification discloses assigning director authority in a system that streams digital content from a multiplicity of sources of digital information to a multiplicity of client devices under control of a multiplicity of directors, embodiments implemented in conjunction with a network of digital computers, at least one of the digital computers comprising a content server upon which the steps of the method are implemented in computer memory and upon at least one computer processor, each director having director attributes, the content server including a store of director instruction records wherein each director instruction record represents one director instruction. Embodiments typically include extracting for a director, in dependence upon the director's attributes, director instructions from the store of director instruction records; and downloading the extracted director instructions to the director.

Embodiments typically include logging in a director to the content server and determining the director's attributes, determining the director's attributes further comprising reading a store of director records wherein each director record represents one director, each director record comprising a director identification. In many embodiments, each director record further comprises a director authority. In many embodiments, the director attributes include director authority, at least one director has administrative director authority, and administrative director authority includes authority to edit the director instruction records. In many embodiments in which the director attributes include director authority, the embodiments typically include editing the director instruction records, the editing carried out through a director having administrative director authority.

Some embodiments include among director attributes a director identity, and the director instruction records in such embodiments typically include a director instruction identity. In such embodiments, extracting director instructions typically includes determining a director identity and extracting from the store of director instructions director instructions having director instruction identities equal to the director identity.

Some embodiments include among the director's attributes a director authority, and the director instruction records comprise a director instruction authority. In such embodiments, extracting director instructions typically includes determining a director authority and extracting from the store of director instructions director instructions having director instruction authorities equal to the director authority.

In many embodiments, director instructions include URLs. In typical embodiments, director instructions include URLs and anchors. Such embodiments typically include encoding the extracted director instructions into hyperlinks in an HTML document. In such embodiments, downloading the extracted director instructions to the director comprises downloading an HTML document to the director.

This Summary is presented primarily in terms of method. In summary, additional aspects of the invention include many embodiments as systems, that is, computing devices or computer systems, as well as computer program products. The foregoing and other objects, features and advantages of the invention will be apparent from the following more particular description of exemplary embodiments of the invention, as illustrated in the accompanying drawings wherein like reference numbers represent like parts of the invention.

DETAILED DESCRIPTION OF EXEMPLARY EMBODIMENTS

Introduction

The present invention is described primarily in terms of methods for remote directions of networked streaming digital content presentations. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the terms "field," "data element," and "attribute" are used as synonyms, referring to individual elements of digital date. Aggregates of data elements are referred to as "records" or "data structures." Definitions of complex data structures that include member methods, functions, or software routines in addition to data elements are referred to as "classes." Instances of complex data structures are referred to as "objects" or "class objects."

"API" refers to an application program interface. APIs are standard sets of routines, protocols, and tools for building software applications.

The terms "client," "client device," and "device" are used as synonyms in this specification, referring to any device capable of accessing a server through a network. Examples of client devices are personal computers, special purpose devices that are internet-enabled, internet-capable personal data organizers, and others that will occur to those of skill in the art. Various embodiments of client devices are capable of wired and/or wireless network access. The use as a client device of any instrument capable of accessing a server through a network is well within the present invention.

The term "network" is used in this specification to mean any networked coupling for data communications. Examples of networks useful with the invention include intranets, extranets, internets, local area networks, wide area networks, and other network arrangements as will occur to those of skill in the art. The use of any networked coupling from client devices to one or more content servers is well within the scope of the present invention.

The term "servlets" refers to software modules that extend request/response-oriented servers, such as Java-enabled web servers. For example, a servlet might be responsible for taking data in an HTML order-entry form and applying the business logic used to update a company's order database. Servlets are to servers what applets are to browsers. Unlike applets, however, servlets have no graphical user interface. Servlets can be embedded in many different servers because typical servlet APIs assume nothing about a server's environment or protocol. As a practical matter, servlets are most widely used within HTTP servers, and many web servers support Java servlet technology.

"CGI" refers to the standard Common Gateway Interface for implementation of server scripts. Servlets are an effective replacement for CGI scripts. Servlets provide a way to generate dynamic documents that is both easier to write and faster to run. Servlets also address the problem of doing server-side programming with platform-specific APIs: they are developed with a Java Servlet API, a standard Java extension. In this fashion, in typical embodiments of the present invention, servlets are used to handle HTTP requests issued through browsers from client devices.

In conjunction with multithreading technology, which is strongly supported in Java for example, servlets are very supportive of collaboration among people. A single servlet can handle multiple requests concurrently, and can synchronize requests. Servlets can forward requests to other servers and servlets, so that servlets can be used to balance load among several servers that mirror the same content, and to partition a single logical service over several servers, according to task type or organizational boundaries.

"URL" means Universal Resource Locator, the standard method of associating world wide web data locations with network addresses for data communications. Many embodiments of the invention function by associating URLs with Java member methods in servlets on content servers, the member methods being called, run, invoked, or activated by invocation of associated URLs. In fact, some standard forms of URL are capable of directly identifying servlets, member methods within servlets, and providing data parameters for use in calls to member methods in servlets. Such URLs are typically invoked through areas of display screens in client devices, the display screen areas being activated for receipt of mouse clicks, gestures, shortcuts, keystrokes on keyboards, or other physical indications of URL selection or invocation.

Servlet URLs can be used in HTML tags, where, for example, would otherwise be found URLs for CGI scripts or URLs identifying file locations on web sites. Servlet URLs are used, for example, as destinations of HTML anchors, as actions in HTML forms, and as locations to be used when HTML META tags direct that HTML pages be refreshed.

"World Wide Web," or more simply "the web," refers to the well-known system of internet protocol ("IP") servers that support specially formatted documents, documents formatted in a language called HTML for HyperText Markup Language. The term "web" is used in this specification also to refer to any server or connected group or interconnected groups of servers that implement the HyperText Transport Protocol, "HTTP," in support of URLs and HTML documents, regardless whether such servers or groups of servers are coupled to the world wide web as such.

"Browser" means a web browser, a software application for locating and displaying web pages. Typical browsers today can display text, graphics, audio and video.

HTML supports hyperlinking URLs connecting to other documents as well as graphics, audio, and video. Hyperlinks support changing documents by invoking URLs through "hot spots." In this specification, the term "hot spot" is used to refer to any area of a display, the area being associated with a particular URL, which area is sensitive to physical indications of invocation, including for example, mouse clicks on radio buttons and shortcut graffiti gestures on scratch pads of personal data organizers such as Palm Pilots™.

"Hyperlink" refers to an HTML instruction having, for example, a format similar to the following:

<a href=URL>ANCHOR</a>

The <a is an HTML "tag." In this example, the <a implies "anchor," in turn implying that this HTML instruction is a hyperlink. The URL identifies a location on an internet of a document for downloading or a program for execution. The "anchor" identifies text on a screen, a screen image, area of screen, or a hot spot, through which the URL can be invoked by user action on a browser. The 'screen' can be any physical input device, including, for example, a video screen on a personal computer or a scratch pad on a hand-held personal data administrator. A hot spot can be any area of screen, sometimes affirmatively identified, sometime not. The </a> is an 'end-tag' indicating the textual end of the hyperlink. Because the anchor is the visible portion of a hyperlink, in general parlance the anchor is sometimes referred to as a hyperlink. In this specification, however, the term hyperlink is generally used as just described.

For purposes of more detailed explanation, refer to the following additional example hyperlink:

<a href="/content_server/select_car_commercials>Select Car Commercials</a>

This example hyperlink downloaded to a browser on a client device as part of an HTML document has the effect of displaying on a display device the words "Select Car Commercial," so that the words are highlighted or underlined, indicating that the words represent an invocable hot spot for a hyperlink. Invoking the hot spot by, for example, mouse-clicking it, has the effect of invoking the URL, "/content_server/select_car_commercial." The form of the URL in this example indicates that the URL identifies an executable program known to the content server. Invoking the anchor, the hot spot identified by the words "Select Car Commercial," therefore has the effect of executing on the content server an executable program called "select_car_commercials."

Detailed Description

This specification discloses example embodiments of methods, systems, and products for controlling and delivering digital content to a number of clients. In typical embodiments, the clients need not control separate digital content feeds but rather will get a consistent feed based on the preemption and routing of the digital feeds from a content server. In typical embodiments, a director controls the content server, and most embodiments support as a director any device that can attain network access. More specifically, there is in typical embodiments no requirement that the director be a terminal directly coupled to the content server.

Typical embodiments of the inventive methods and systems provide means for distributing any form of digital content from any digital media to any number of web clients while maintaining a control mechanism by a remote director. This control mechanism or director further supports changing digital content sources and streams, and changing attributes such as frame rates, so as to provide seamless presentations to any number of clients. Typical embodiments of the director mechanism allow for a hands-off approach in terms of the client devices. Users in typical embodiments are not required to operate any controls on client devices but rather can simply view the contents of the streaming presentation.

Figure 1:
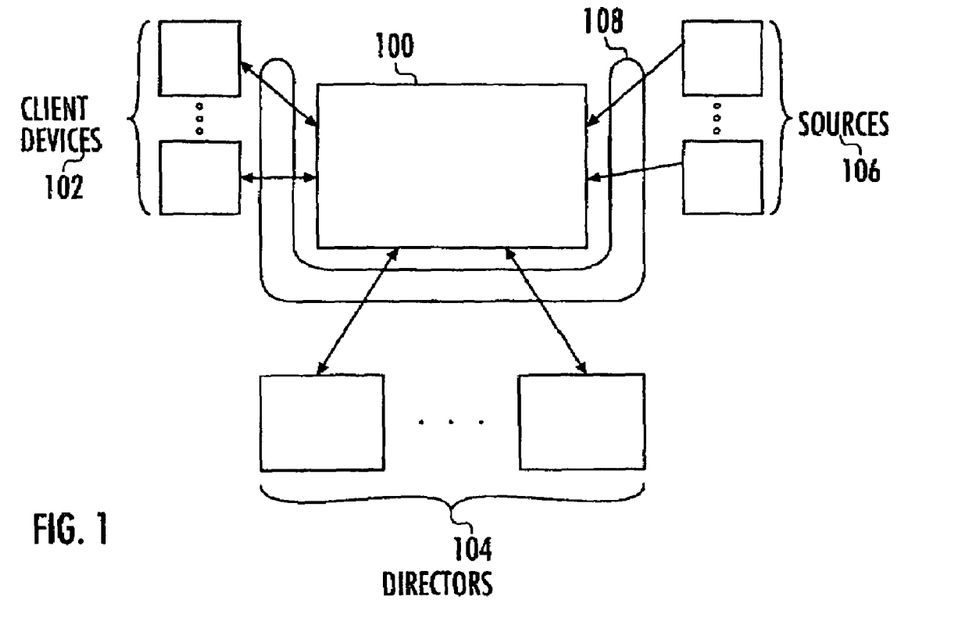
FIG. 1 is an overall block view of an embodiment of a system for remote direction of streaming digital content.

Referring to FIG. 1, an aspect of the invention is seen as a system for assigning authority to a multiplicity of directors (104) for control of streaming digital content from a multiplicity of sources (106) to a multiplicity of client devices (102) implemented upon a network (108) of digital computers, at least one of the digital computers comprising a content server (100) upon which system is implemented in computer memory and at least one computer processor.

Figure 2:
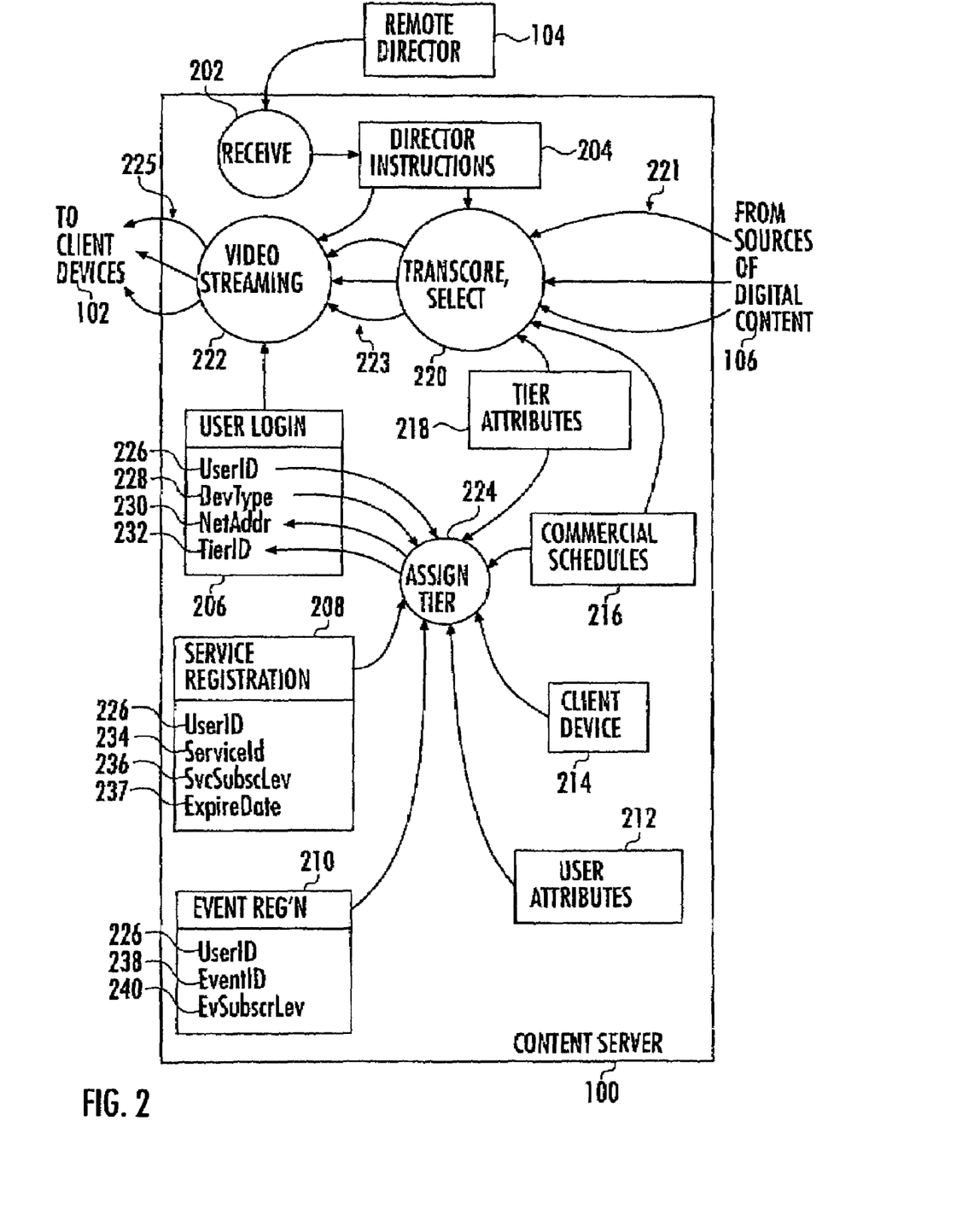
FIG. 2 is a process flow diagram illustrating several example embodiments of methods of remote direction of streaming digital content.

A more detailed example embodiment is shown in FIG. 2 as including a method of remote direction of streaming digital content. The example of FIG. 2 includes also receiving (221) digital content from sources (106), the digital content having many different digital formats. Examples of digital formats useful with various embodiments of the invention include JPEG, MP3, MPEG, GIF, HTML, text, XML, and the like. Other digital formats for digital content will occur to those of skill in the art, all of which formats are useful with embodiments of the present invention.

A further embodiment shown in FIG. 2 includes receiving (202), from a remote director (104), and storing in computer memory, remote director instructions (204), the remote director instructions including instructions for selections of digital content for inclusion in an output stream. The illustrated embodiment further includes transcoding (220) the digital content from sources into digital content having streaming format (223).

The illustrated embodiment also includes in at least one output stream (225), in dependence upon the remote director's instructions, digital content having streaming format. The illustrated embodiment, as do typical embodiments, includes communicating through a data communications network to at least one client device (102) the output stream (225).

In typical embodiments, client devices comprise client device attributes, and transcoding includes transcoding in dependence upon the client device attributes. More specifically, for example, transcoding includes in typical embodiments transforming digital data content to conform to a device's screen size, color requirements, or audio availability. Client device attributes typically include, for example, device type, screen size, frame rate, and audio availability.

In typical embodiments, transcoding includes transforming JPEG images into streaming format. In many embodiments, transcoding includes transforming a digitized digital content feed from a video camera into streaming format. In many embodiments, transcoding includes transforming a digitized video feed from a video camera into streaming format for a particular screen size or a particular frame rate. Transcodings including other data transformations as will occur to those of skill in the art. Any transformation of digital content is well within the scope of the present invention.

In many embodiments, the remote director (104) comprises a personal computer coupled through a network to the content server (100), and the method in many embodiments includes sending from the remote director to the content server remote director instructions (204). In many embodiments, sending director instructions includes invoking through URLs displayed on a terminal of the remote director member methods of servlets installed on the content server, each URL invoking a single servlet member method, each servlet programmed to administer threads of execution to carry out remote director instructions. In many embodiments servlets comprise member methods in Java objects, and invoking a servlet, or invoking a servlet member method, means to call a public member method in a Java object. In many embodiments, the member methods are implemented as Java thread-level URL dispatch routines. Remote director instructions typically comprise at least one instruction to select for transcoding and streaming digital content from a specific source.

More specifically, for example, servlet URLs are typically implemented in the following form:

browser url="http://myIP:8080/servlet/
        myservlet?parm1=parameter1 browser url="http://myIP/
        myservlet?parm1=1&parm2=2

The following is a typical example of an embodiment of servlet structure represented in pseudocode:

```
import javax.servlet.*;
import javax.servlet.http.*;
public class myservlet extends HttpServlet
{
    public void init(ServletConfig conf) throws ServletException
    {
        super.init(conf);
        ...
    }
    public void service(HttpServletRequest req,
    HttpServletResponse res) throws
            IOException { }
    public void destroy( ) { }
}
```

The following is a typical example of a computer program, in this particular example, a Java member method implemented as a Java thread-level URL dispatch routine and depicted in the following pseudocode:

public void service(HttpServletRequest req, HttpServlet-
        Response res) throws
        IOException

```
        {
            request = req.getParameter("request");
            if(request.equalsIgnoreCase("view"))
                getView( );
            if(request.equalsIgnoreCase("reset"))
                reset( );
        }
```

Figure 4A:
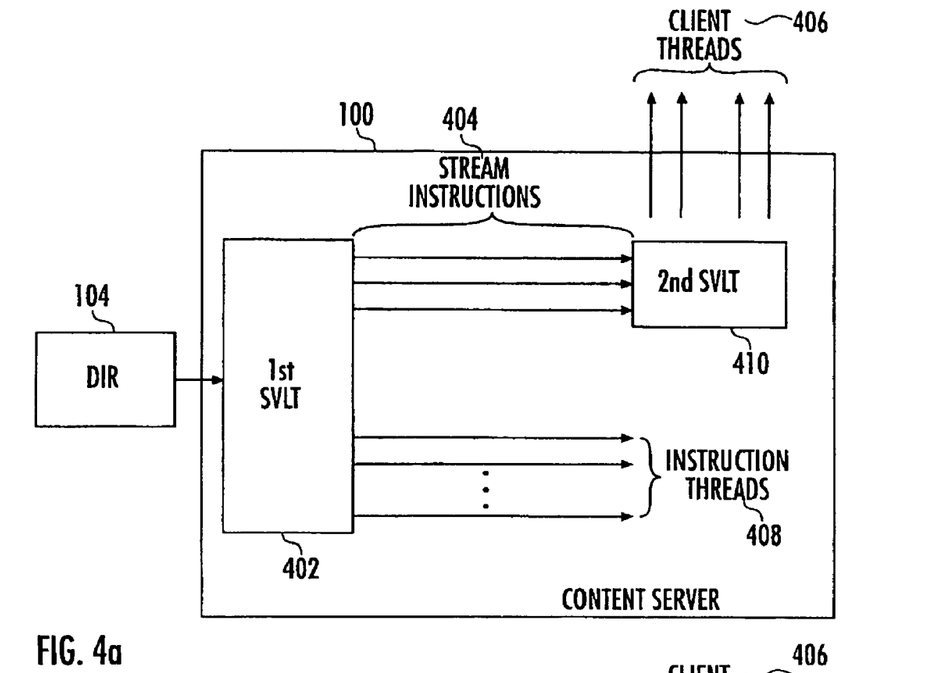
FIG. 4a illustrates an example embodiment of an alternative servlet architecture.

FIGS. 4a and 4b illustrated embodiments of alternative servlet architectures. The example embodiment shown in FIG. 4a includes a director (104) coupled for data communications to a first servlet wherein the first servlet administers threads of execution for remote director instructions (408). The example architecture of FIG. 4a includes also a second servlet (410), the second servlet being configured to administer threads of execution which themselves carry out data communications with individual client devices. In typical embodiments, each thread of execution for a client device (406) is assigned to a particular client device located on a network by an internet protocol address known to the thread. In the example architecture of FIG. 4a, the first servlet is coupled to the second servlet for communication of data and for communication of instructions by calls to member methods within the second servlet. In the example architecture of FIG. 4a, the coupling between the two servlets is accomplished through threads of execution administered by the first servlet. In embodiments of this kind it is typical that each thread would be assigned responsibility for carrying out one remote director instruction regarding control of the streams of digital content communicated to client devices by use of the client communications threads of the second servlet. Further alternative embodiments of inter-servlet communications and control will occur to those of skill in the art, all such embodiments being well within the scope of the present invention.

Figure 4B:
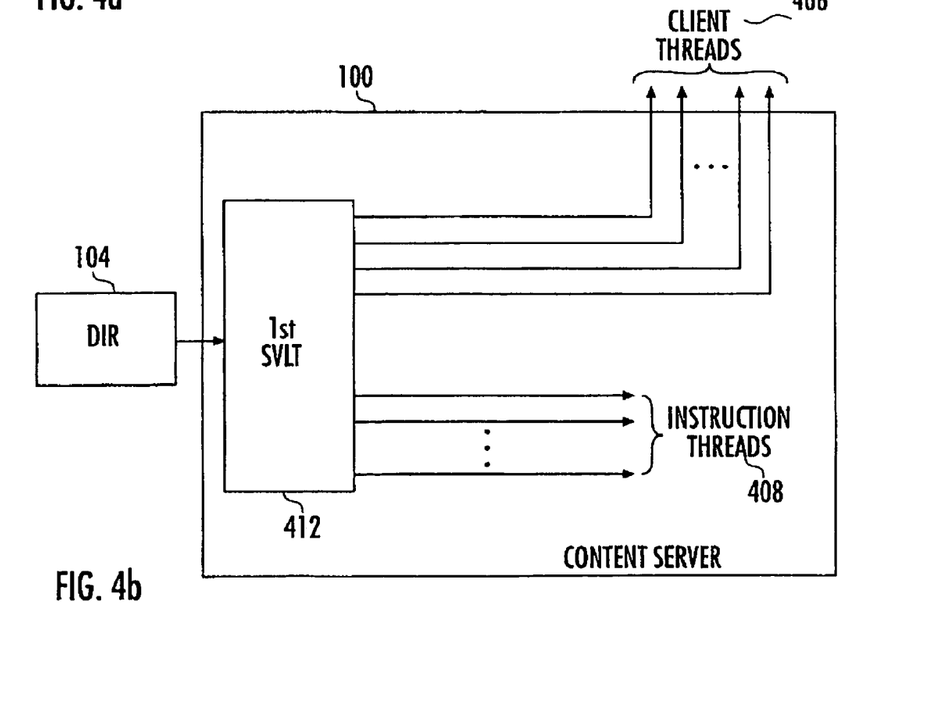
FIG. 4b illustrates an example embodiment of an alternative servlet architecture.

FIG. 4b illustrates an alternative example embodiment of servlet architecture useful with the present invention. In the example embodiment of FIG. 4b, both the threads for client communications (406) and the threads for execution of remote director instructions (408) are implemented through a single servlet (412). Alternative example architectures include implementation of an additional servlet administering threads of execution for data conversion and transcoding, or an additional servlet administering threads of execution for selecting particular sources of digital content for particular output streams. Further alternative embodiments of servlet architecture will occur to those of skill in the art, all such embodiments being well within the scope of the present invention.

It is useful to note that in typical embodiments, there is no required physical difference between the director and the client devices. Both are often personal computers coupled for data communications through a network to a content server. What distinguishes the director in typical embodiments is that the director in logging on to the server is accorded access through URLs to member methods to which access is restricted to users having director privileges. In many embodiments, only one director is allowed access at any particular time, to reduce the risk of conflicting director instructions, although there is no particular exclusion within the invention itself of allowing more than one director coupled to a content server.

Many embodiments of the present invention include registering a user for a service, the service being identified by a service identification code. FIG. 2 at reference 208 shows an example embodiment of a data structure representing a user's registration for a service, including a user identification code (226), a service identification code (234), and a service subscriber level (236). The service subscriber level is included in the illustration because many embodiments associate fee structures and levels of service with service subscription levels. Services typically comprise aggregations of digital content streamed through one or more websites to users through client devices over an extended period of time. Indeed, in typical embodiments, the services themselves are not time-limited, although the user's service registrations often are (237). User's service registrations are often time-limited because fee structures impose time limits on the service registrations as such, although such time limits to not affect the services themselves.

Typical embodiments include logging in a user for the access to a service. Logging in a user typically includes assigning values to user login attributes (206), including for example, user identification (226), device type (228), network address (230), and a tier (232). The user identification typically is determined through a login prompt. The device type in typical embodiments is derived from a browser header at logon. The network address in many embodiments is an internet protocol address, in many embodiments used to comprise a socket.

Figure 2A:
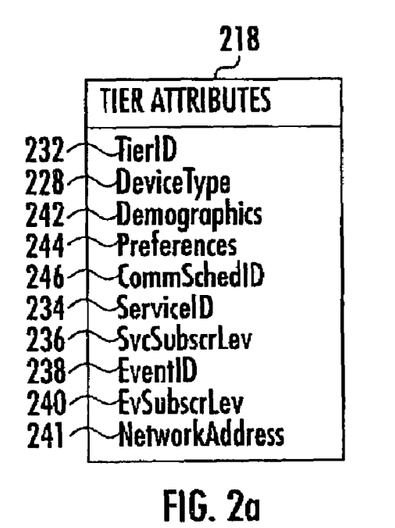
FIG. 2a is a data structure diagram of exemplary embodiments of attributes of tiers.
Figure 2B:
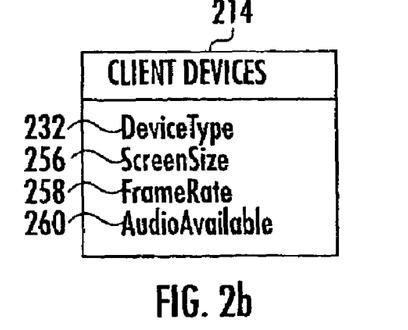
FIG. 2b is a data structure diagram of exemplary embodiments of attributes of client devices.
Figure 2C:
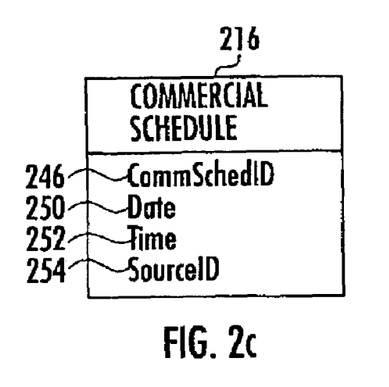
FIG. 2c is a data structure diagram of exemplary embodiments of attributes of commercial schedules.
Figure 2D:
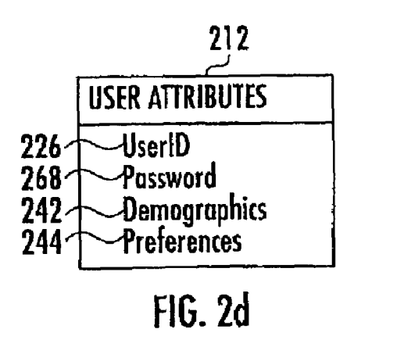
FIG. 2d is a data structure diagram of exemplary embodiments of attributes of users.

The tier is an identifier for a group of client devices identified according to grouping factors such as, for example, device type, subscription level, user demographics or user preferences. Tiers in typical embodiments are identified in tier attribute data structures such as the one illustrated for example at reference 218 in FIG. 2. A more detailed example embodiment of a data structure representing a tier is illustrated at FIG. 2a, where an example tier is shown as including a tier identification code (232), a device type (228), a data element for user demographics (242), a data indication of user preferences (244), a commercial schedule identification code (246), a service identification code (234), a service subscriber level (236), an event identification code (238), and an event subscription level (240).

Demographics include such user attributes as age, residence location, income level, occupation, and other demographics as may occur to those of skill in the art. Embodiments using any demographic are well within the scope of the present invention. User preferences include attribute indicators of special needs in support of disabilities, content limitations such as exclusions of adult material, profane language, or depictions of violence, preferences regarding subjects of commercial messages, and other user preferences as occur to those of skill in the art. Embodiments using any attribute indicators of any user preference regarding digital content are well within the scope of the present invention.

Typical embodiments also include assigning a tier value in dependence upon the device type and the service identification code. In typical embodiments, director selection of digital content and transcoding are also dependent upon tiers. In typical embodiments, registering a user includes creating a service registration record (208) comprising service registration attributes comprising user identification (226), service identification (234), service subscription level (236), and service expiration date (237), and in such embodiments, assigning a tier value typically include assigning a tier value in dependence upon the service subscription level.

The director in such embodiments has the capability of formulating output streams according to tier. Thus an embodiment utilizing the example structure shown in FIG. 2a, has the capability of presenting digital content in one or more output streams comprising a particular tier, for example, for a hand-held, network-capable, personal data organizer having a screen size of 800×600 pixels (according to device type 228), with content filtered to exclude graphic violence (according to user preference 244), with commercial content filtered to include automobile advertisements (user preference), with commercial content further filtered to exclude automobile advertisements for automobiles costing less than $30,000 (demographics 242), with commercials scheduled so as to occur no more than once per half-hour (in dependence upon service subscription level 236). Typical director access to servlets on the content server means that director instructions issued at any time by invoking URLs with as little as a single mouse click, one digitizing pad gesture, or a single keystroke, seamlessly and immediately alter tier structure and therefore the presentation of digital content to users of client devices in a tier.

Typical embodiments also include communicating to at least one of the client devices an output stream (225). In such embodiments, communicating the output stream or streams further comprises communicating the output stream to the network address (230) associated with a user's login (206 on FIG. 2). It is useful to note that in many embodiments, the network address associated with a user's login is a network address, typically associated with a URL, through which digital content is provided for a tier, as at the example at reference (241) in FIG. 2a. That is, in such embodiments, as shown in FIG. 2, the tier assignment function (224) assigns to the user login (206) a tier (232) according to client device type (214), user attributes (212), commercial schedules (216), and service registrations (208) or event registrations (210).

Many embodiments that assign network addresses to tiers, as shown for example at reference 241 in FIG. 2a, do not use network addresses in user logins, because in such embodiments, the stream output to the user and the user's client device will be directed through the network address identified with the tier. Some embodiments do not use tiers; such embodiments typically therefore assign a network address to individual user logins. In many embodiments, the assigned network address, whether it is assigned directly through a user login or indirectly through a tier structure, identifies a URL to which the client device browser is directed at login, the URL identifying a website location through which an output stream for the tier is delivered to client devices associated with user logins having the same assigned tier.

Figure 2E:
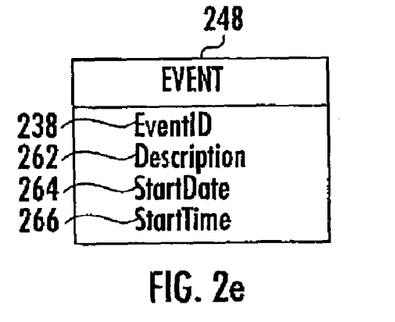
FIG. 2e is a data structure diagram of exemplary embodiments of attributes of events.

Turning again to FIG. 2, an additional example embodiment is shown as including registering a user for an event (210). Event registrations (210) typically include attributes for user identification (226), event identification (238), and event subscription level (240). Events are aggregations of digital content presented through networks to client devices, the events having a start date (264) and a start time (266), that is, a defined approximate beginning time, events typically being identified as shown in the example of FIG. 2e, by an event identification code (238). Events typically aggregate at least at least one output stream and at least one source.

The invention itself does not necessarily require event codes as such, although most embodiments do employ some means, such as event codes, of associating the aggregate of sources comprising an event. Alternative ways of identifying an aggregate of sources includes, for example, listing the sources in a list and using a single server for an event in which all sources available to the server are considered sources for an event. Events in typical embodiments are distinguished from services by possession of a starting time and typically also a defined duration, or an approximate duration, whereas services typically are ongoing for undetermined durations.

Embodiments comprising events typically include logging in users for the event, logging in users typically including assigning values to user login attributes (206), the user login attributes typically including user identification (226), device type (228), network address (230), and a tier identification (232).

In embodiments including events, tier values typically are assigned in dependence upon event identification codes (240). Many embodiments that include events also assign tiers in dependence upon event subscription levels (240). Of course many such embodiments also assign tiers in dependence upon device types, demographics, or user preferences.

Figure 3:
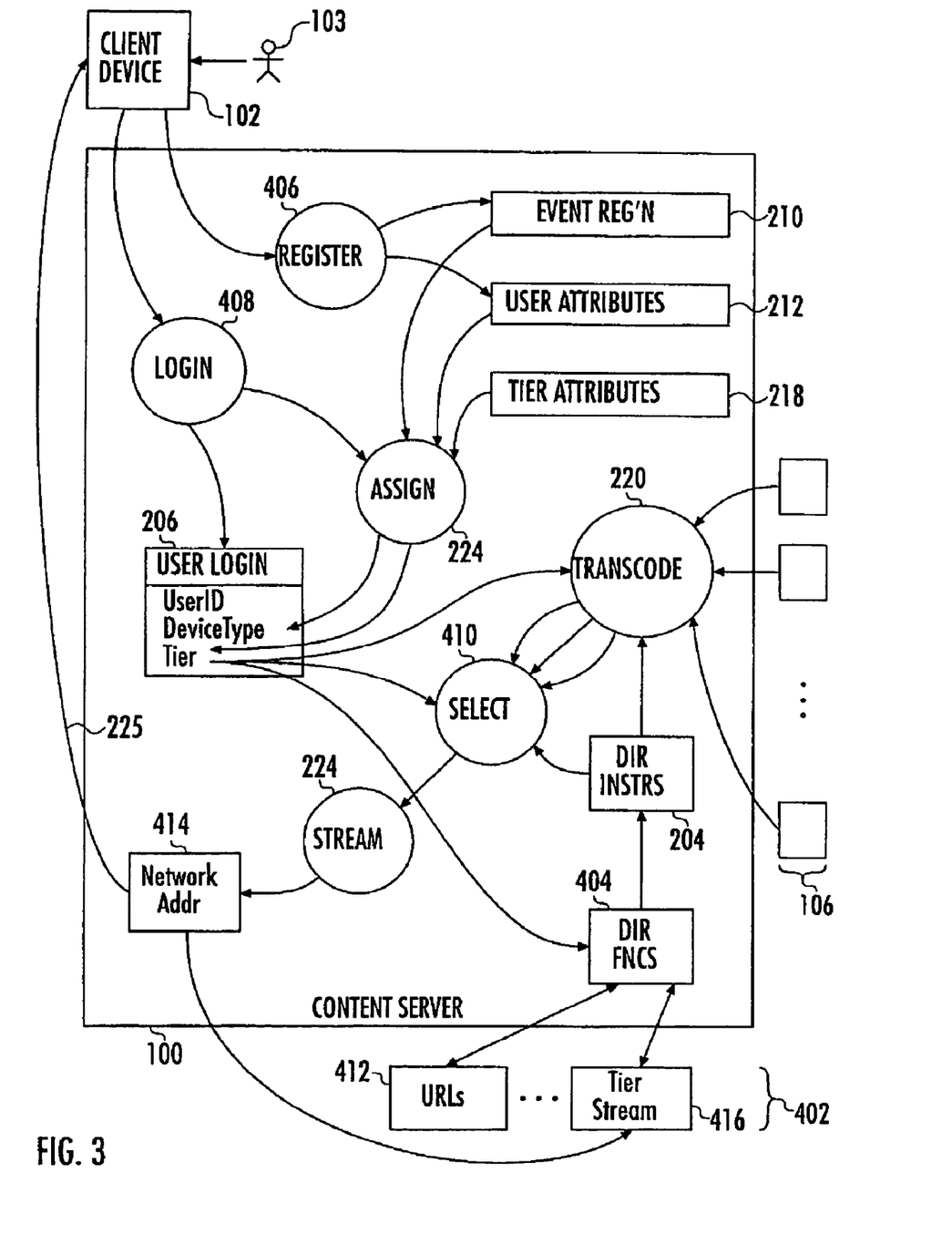
FIG. 3 is an example embodiment illustrated as a use case.

Turning now to FIG. 3, an embodiment of the method of the present invention is illustrated as a use case for an event comprising a football game. In the illustrated embodiment of FIG. 3, a user (103) through a client device (102) registers (406) for an event. The use in the illustrated case has no previous service registration, is therefore unknown to the content server, and user attributes (212), including preferences and demographics, are therefore gathered at registration. Registering for this previously unknown user includes assigning to the use a user identification code.

After registering for the event, either prior to or after the event begins, the user logs in (408) to view the event. At login, the user login record (206) is created and assigned (224) a device type and a tier. The device type is either taken from a default device type stored in user attributes at the time of registration, or is taken from a browser header at the time of login. The tier is assigned by matching user attributes with tier attributes among more than one tier record and selecting a tier whose demographics, user preferences, and device type match or approximately match the user's demographics, user preferences, and/or device type.

Now in the illustrated embodiment of FIG. 3, transcoding (220) and digital content selection (410) for an output stream for the tier are all accomplished in dependence upon the tier value so assigned. If, for example, the tier assigned on the basis of device type and user attributes has attributes including a device being a high definition video screen, no preferences as to language, violence, or adult content, and demographics of high income bracket, an output stream having digital content meeting these requirements is formulated by transcoding and selecting digital content in response to director instructions. The output stream (225) so formulated is communicated (224) in the illustrated embodiment to the user (103) through the client device (102) from the network address (414) associated by the tier (218) with the output stream (225).

If after registration no tier exists that is a good match for the user attributes, a new tier is created having attributes that well match user attributes. Creating a new tier merely includes typing in through a keyboard, for example, into a new tier record, a new set of tier attributes including a network address or URL through which an output stream formulated in accordance with the new tier attributes is communicated to client devices. In typical embodiments the quality of match between tier attributes and user attributes is determined according to tier selection criteria. Many formulations of tier selection criteria will occur to those of skill in the art. Any tier matching criteria used with any embodiment of the invention are well within the scope of the invention.

In the illustrated embodiment of FIG. 3, the software functions (404) associated with a director are stored in a content server (100). Coupled through a network for data communication to the content server in the illustrated embodiment are several personal computers comprising director workstations (402). In typical embodiments of this kind, at least one of the director workstations (416) is configured to present output streams formulated for tiers in dependence upon director's instructions. In such embodiments, at least one of the director workstations (412) is configured to present for invocation through a user interface URLs that in turn invoke director functions or member methods comprising director functions such as servlets that when invoked or called issue or comprise director instructions for transcoding and selecting digital content to formulate of an output stream.

In typical embodiments that include events, selections effected by director instructions are dependent upon the tier, and transcoding includes transcoding in dependence upon the tier. Director instructions for selection of digital content and transcoding in dependence upon tier result in output streams formulated and presented according to tier, and in such embodiments, communicating to client devices the output stream includes communicating the output stream to a network address associated with a user login. As described above, typical embodiments utilizing events assign the network address for communication of output streams through the tier (reference 241 on FIG. 2a).

Figure 5:
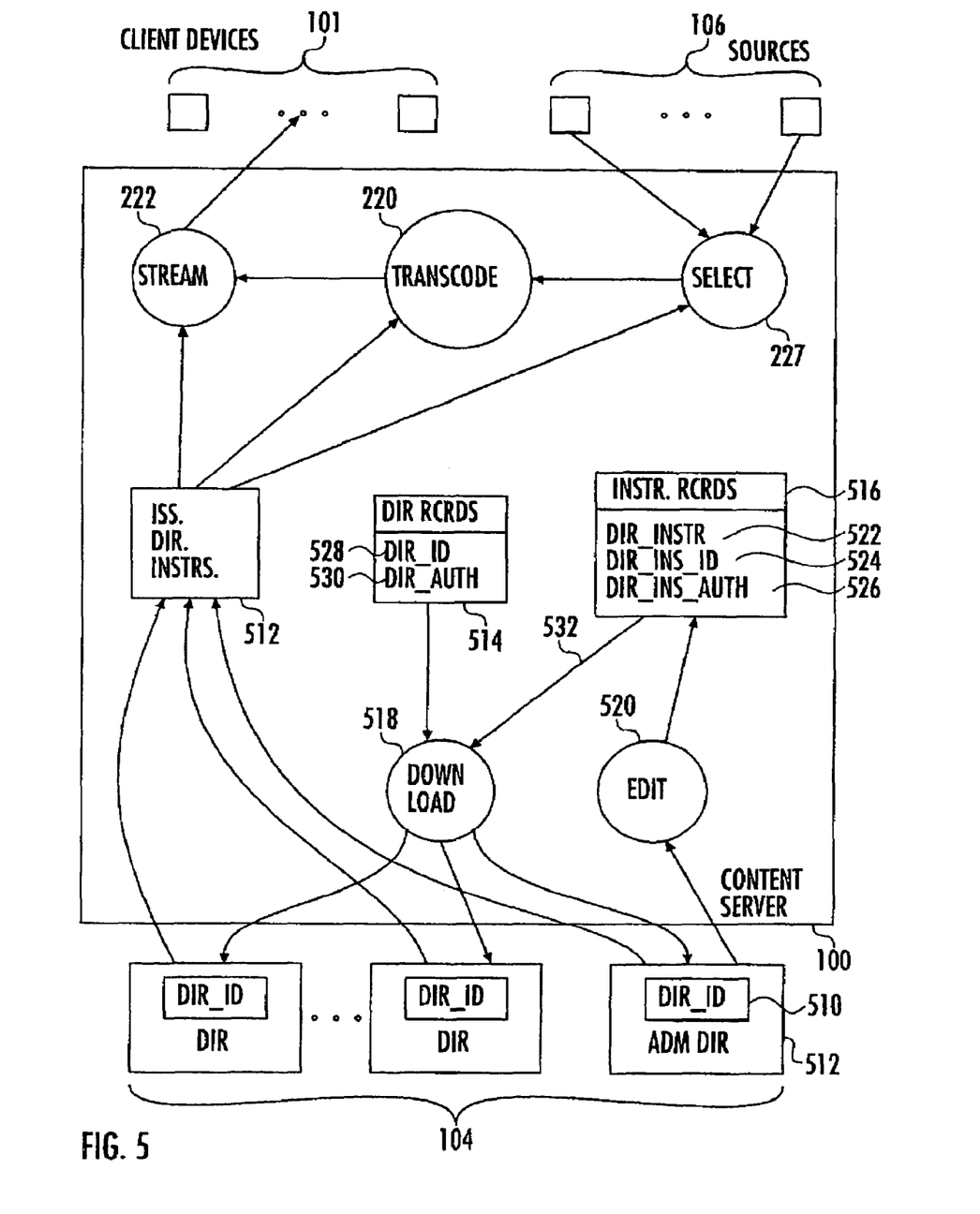
FIG. 5 is a control flow diagram of embodiments assigning director authority.

Turning now to FIG. 5, an aspect of the invention is seen as a method of assigning director authority in a system that streams digital content from a multiplicity of sources (106) of digital information to a multiplicity of client devices (102) under control of a multiplicity of directors (104), the method implemented in conjunction with a network of digital computers, at least one of the digital computers comprising a content server (100) upon which the steps of the method are implemented in computer memory and upon at least one computer processor, each director having director attributes (514), the content server including a store of director instruction records (516) wherein each director instruction record represents one director instruction.

Figure 6:
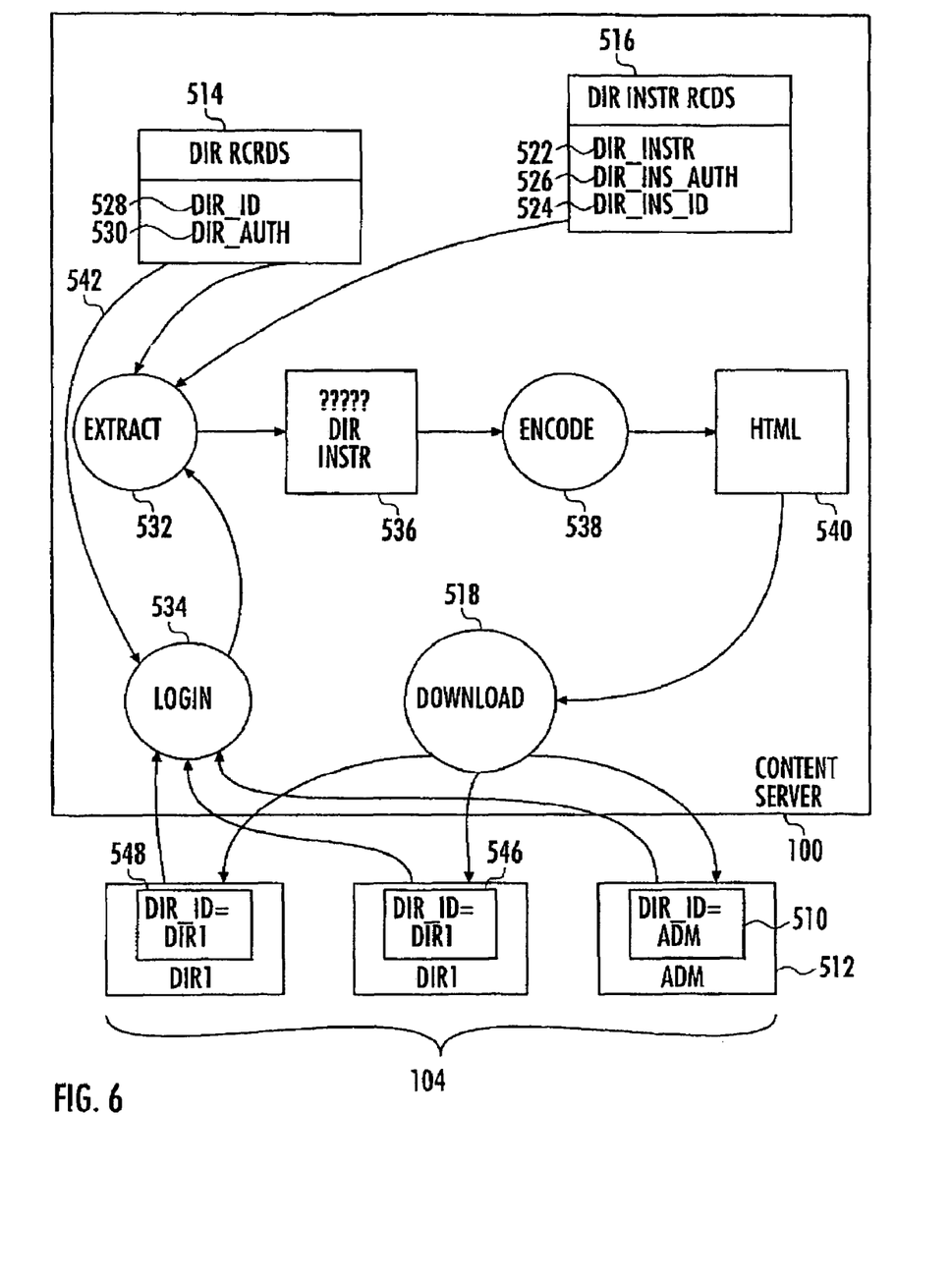
FIG. 6 is a control flow diagram of further embodiments assigning director authority.

A further embodiment, illustrated in FIG. 6, includes extracting (532) for a director, in dependence upon the director's attributes (514), director instructions (536) from a store of director instruction records (516). The illustrated embodiment includes downloading (518) the extracted director instructions to the director.

The embodiment shown in FIG. 6 includes logging in (534) a director to the content server and determining the director's attributes by reading (542) a store of director records (514) wherein each director record represents one director, and each director record includes a director identification (528). The illustrated embodiment includes an optional director authority (530) among the director attributes in the director records.

In the example embodiment illustrated in FIG. 6, the director attributes include an optional director authority (530), at least one director (512) has administrative director authority (544), and administrative director authority includes authority to edit (reference 520 on FIG. 5) the director instruction records (516). As shown for the example embodiment of FIG. 5, in some embodiments, the director attributes (514) include director authority (530), and such embodiments typically include editing (520) the director instruction records (516). The editing in such embodiments typically is carried out through a director (512) having administrative director authority.

In typical embodiments, director attributes include a director identity (528), and the director instruction records (516) include a director instruction identity (524). In such embodiments, extracting (532) director instructions typically includes determining a director identity by reading (542) the director records at login (534). In such embodiments, extracting director instructions typically includes extracting (532) from the store of director instructions director instructions having director instruction identities (524) equal to the director identity (528) determined at login.

In some embodiments, director attributes include a director authority (530), and director instruction records include a director instruction authority (526). In such embodiments, extracting director instructions (532) typically includes determining a director authority, for example, by prompting for it at login (534), and extracting (532) from a store of director instructions (516) director instructions having director instruction authorities (526) equal to the director authority.

In typical embodiments, director instructions comprise URLs. In some embodiments, the director instructions comprise URLs and anchors. Typical embodiments, for example, to represent a director instruction for selecting and streaming to client devices a feed of digital content from camera number one store in a director instruction record a URL "\\content_server\servlet1.camera1" and an anchor "Camera Number One." Such embodiments encode the director instruction in a hyperlink as:

<a href=\\content_server\servlet1.camera1>Camera Number One</a> which when downloaded to a director in an HTML document displays upon the director's screen the anchor, highlighted or underscored, "Camera Number One," which when invoked by a mouse-click on the anchor has the effect of streaming to client devices the feed of digital content from camera number one.

In other embodiments, anchors are inferred rather than stored, as, for example, in cases in which an executable program name embedded within a URL can be extracted and encoded as an anchor, as, for example, is the case for the URL, "\\content_server\servlet1.Camera_1," in which the executable program name "Camera_1" both identifies an executable program that selects a digital feed from camera number one and directs that digital feed into an output stream of digital content and also is parsed out of the URL and encoded directly into a hyperlink, for example, having the form:

<a href=\\content_server\servlet1.Camera_1>Camera_1</a> which when downloaded to a director in an HTML document displays upon the director's screen the anchor, highlighted or underscored, "Camera_1," which when invoked by a mouse-click on the anchor has the effect of streaming to client devices the feed of digital content from camera number one.

Typical embodiments include encoding (538) the extracted director instructions (536) into hyperlinks in an HTML document (540). Such embodiments typically encode URL into hyperlinks by use of program code of the kind illustrated in the following segment of pseudocode:

```
out.println(... +
    "<a href=\"" +
    response.encodeURL("\\content_server\servlet1.camera1") +
    "\">Camera Number One</a>  " +
...);
```

In such embodiments, code similar to that of the pseudocode segment encodes for inclusion in HTML documents hyperlinks having approximately the following form:

<a href=\\content_server\servlet1.camera1>Camera Number One</a>

Persons of skill in the art are aware of many ways to encode hyperlinks for HTML documents, all such ways being well within the scope of the present invention. The example URL just above, for example, implies by its form that "camera1" is a Java member method in a class object named "servlet1" on a server named "content server." Persons of skill in the art will recognize that alternative embodiments include URL in a form to invoke CGI scripts or CGI binary executable rather than Java methods.

In many typical embodiments, downloading extracted director instructions to a director typically includes downloading an HTML document to the director. In such embodiments, the HTML document includes URLs encoded as hyperlinks as described above.

Figure 7:
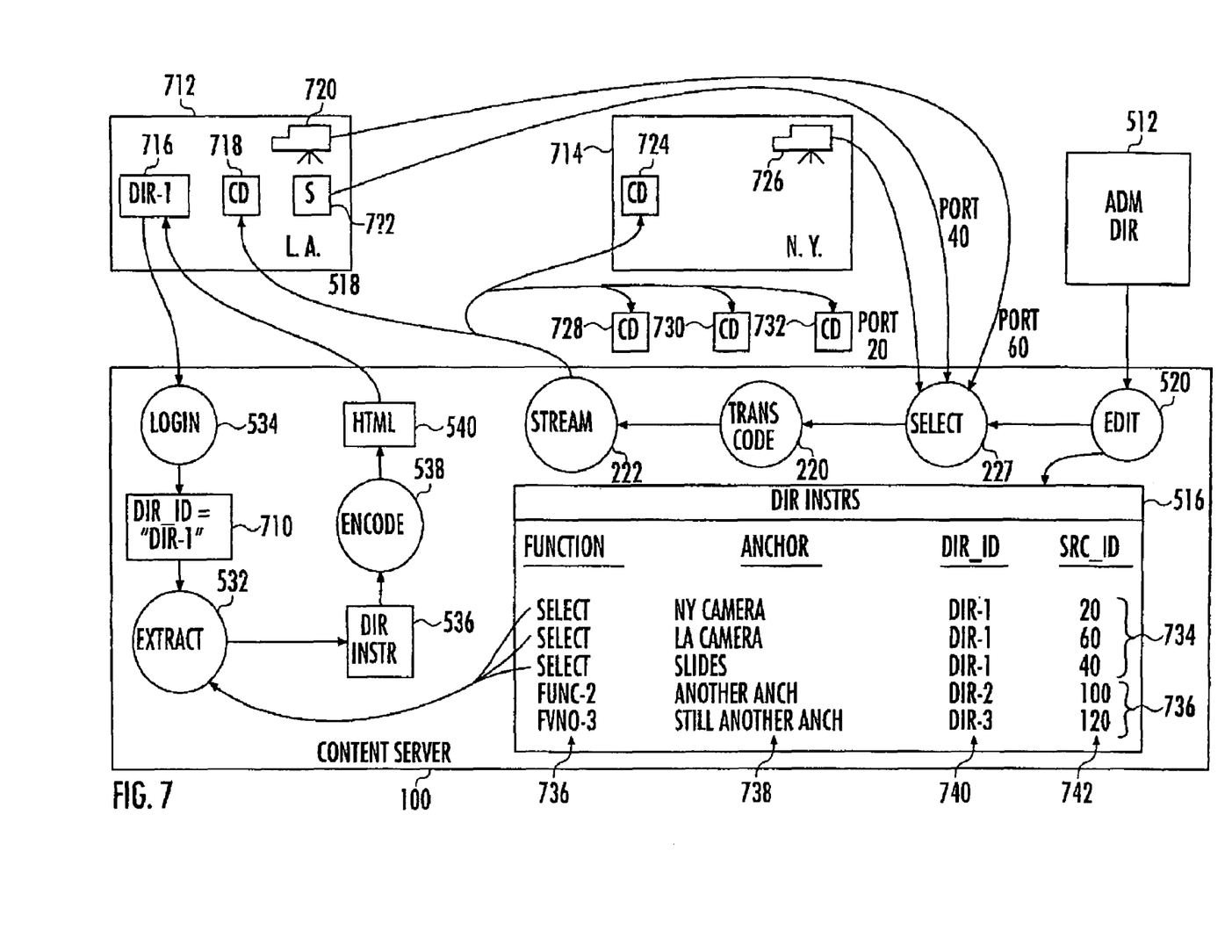
FIG. 7 is a control flow diagram of embodiments assigning director authority for a use case of a video conference.

Turning now to FIG. 7, further example embodiments of the invention are described in connection with an example use case of video conferencing. The example use case includes two conference rooms, one in New York (714) and another in Los Angeles (712). The New York conference room has a video camera (726) coupled for data communications to a content server (100) through port 20. The Los Angeles conference room has a video camera (720) coupled for data communications to the same content server (100) through port 60. The Los Angeles conference room also has an automated slide projector providing a source of digital slides, say, for example, in Microsoft PowerPoint™ format. The video projector, or rather its digital output, is coupled for data communications to the content server through port 40. This specification, for convenience, refers to the digital output of the automated slide projector as "slides."

In the example use case, the video cameras and the slide projector are sources of digital content that are selected (227), transcoded (220), and streamed (222) to client devices as described in detail above in this specification. The example use case includes five client devices, one each in the conference rooms (718, 724), and three additional client devices (728, 730, 732), which can be located anywhere so long as they can be coupled for data communications to the content server. In fact, for purposes of illustration, we assume that the three additional client devices (728, 730, 732) are located respectively in Houston, Singapore, and in Earth orbit on board the International Space Station.

The Los Angeles conference room also has a person computer coupled to the content server and configured as a director. In this sense, "configured as a director" means that the personal computer in the Los Angeles conference room (716), now called a director, will be designated by its user at login as a director and a set of director instructions will be downloaded to it. Although persons of skill in the art will recognize many alternative forms of coupling for data communications, in typical embodiments of the kind illustrated through the example use case, "coupled" or "coupled for data communications" means coupled through an internet using the well-known internet protocol for data communications.

In the example use case, a person operating a personal computer designated and configured as a director (512) having administrative authority, an "administrative director," edits (520) a store of director instructions (516) to include director instructions for selecting among the video cameras and the slides (734). The administrative director edits the pertinent director instructions (734) to include a director identification (740) of "DIR-1," the director ID to be assigned to the director in the Los Angeles conference room.

The director instructions include data elements designating the function (736) of a director instruction, an anchor (738) for each director instruction, a director ID (740) identifying an authorized director for each director instruction, and a source identification (742), which in the example use case is taken as the port number for the source, one of the video cameras or the slides. The form of the director instructions in the illustrated use case disclose that there is no requirement within the present invention for director instructions to include URLs. In some embodiments, for example, that utilize Java member methods to encode hyperlinks into HTML documents, the Java member methods themselves include a servlet name. In other embodiments, servlet names are available from other forms of computer memory.

In the example use case, the person in charge of the video conference enters the Los Angeles conference room and uses the director (716) to log in (534) to the content server and provide through the login function the director ID of "DIR-1." The extract function (532) in the embodiment of the example use case, then extracts from the director instructions (516) the director instructions (734) having director ID fields set to "DIR-1." The extracted director instructions (536) are then encoded (538) into hyperlinks in an HTML document (540) and downloaded (518) to the director (716) in the Los Angeles conference. In the example use case, the content server is named for internet purposes "\\content_server," the selection function (227) is implemented as a Java member method named "source" in a servlet named "servlet1, and encoding the director instruction therefore results in the following hyperlinks:

<a href=\\content_server\servlet1.select?source=20>NY Camera</a>
<a href=\\content_server\servlet1.select?source=60>LA Camera</a>
<a href=\\content_server\servlet1.select?source=40>Slides</a> which when downloaded (518) in an HTML document (540) result in display of the following anchors, highlighted or underlined, on the director's screen in the Los Angeles conference room:

NY Camera

LA Camera

Slides

Mouse-clicking the NY Camera anchor calls the member method "select" in the Java servlet "servlet1" in the content server (100), passing to the member method the parameter "source=20," resulting in selection (227), transcoding (220), and streaming (222) to the client devices the video output from the New York video camera (726). Similarly, clicking on the anchor LA Camera, switches the feed seen by the client devices to the feed from the video camera in the Los Angeles conference room (720), and clicking on the Slides anchor switches the view on the client devices to a slide from the slide projector in Los Angeles (722).

Although the director instructions (516) are illustrated for convenience as having two instructions (736) with director IDs other than "DIR-1," in fact, embodiments typically have many director instructions having many director IDs or other indications of director authority. In the illustrated embodiment in the example use case, director authority is implemented only through director IDs. Many other ways of signifying director authority will occur those of skill in the art, all of which are well within the scope of the present invention. Although the example use case is described primarily in terms one director's control three sources of digital content delivered to five client devices, in fact, in typical embodiments, a content server has many sources and many client devices under control of many directors.

It will be understood from the foregoing description that various modifications and changes may be made in embodiments of the present invention without departing from its true spirit. All exemplary embodiments described in this specification are mere examples, not limiting definitions of the invention. It is intended that descriptions in this specification are only for purposes of illustration and are not to be construed in a limiting sense. The scope of this invention should be limited only by the language of the following claims.

What is claimed is:

1. A method of assigning director authority in a system that streams digital content from a multiplicity of sources of digital information to a multiplicity of client devices under control of a multiplicity of directors, the method implemented in conjunction with a network of digital computers, at least one of the digital computers comprising a content server upon which the steps of the method are implemented in computer memory and upon at least one computer processor, each said director having director attributes, the director attributes comprising a director authority, the content server including a store of director instruction records wherein each said director instruction record represents one director instruction, the director instruction records comprising a director instruction authority, the method comprising the steps of:

extracting for a director, in dependence upon the director's attributes, director instructions from the store of director instruction records; and downloading the extracted director instructions to the director.

2. The method of claim 1 further comprising logging in a director to the content server and determining the director's attributes, determining the director's attributes further comprising reading a store of director records wherein each director record represents one director, each director record comprising a director identification.

3. The method of claim 2 wherein each director record further comprises a director authority.

4. The method of claim 1 wherein:
the director attributes include director authority,
at least one director has administrative director authority, and
administrative director authority includes authority to edit the director instruction records.

5. The method of claim 1, wherein the director attributes include director authority, the method further comprising editing the director instruction records, wherein the editing is carried out through a director having administrative director authority.

6. The method of claim 1 wherein the director attributes comprise a director identity, wherein the director instruction records comprise a director instruction identity, and wherein extracting director instructions comprises the further steps of:

determining a director identity; and
extracting from the store of director instructions director instructions having director instruction identities equal to the director identity.

7. The method of claim 1, wherein the director instructions comprise URLs.

8. The method of claim 1, wherein the director instructions comprise URLs and anchors.

9. The method of claim 1 further comprising encoding the extracted director instructions into hyperlinks in an HTML document.

10. The method of claim 1 wherein downloading the extracted director instructions to the director comprises downloading an HTML document to the director.

11. A system for assigning director authority for streaming digital content from a multiplicity of sources of digital information to a multiplicity of client devices under control of a multiplicity of directors, the system implemented in conjunction with a network of digital computers, at least one of the digital computers comprising a content server upon which the system is implemented in computer memory and upon at least one computer processor, each said director having director attributes, the director attributes comprising a director authority, the content server including a store of director instruction records wherein each said director instruction record represents one director instruction, the director instruction records comprising a director instruction authority, the system comprising:

means for extracting for a director, in dependence upon the director's attributes, director instructions from the store of director instruction records; and     means for downloading the extracted director instructions to the director.

12. The system of claim 11 further comprising means for logging in a director to the content server and means for determining the director's attributes, means for determining the director's attributes further comprising means for reading a store of director records wherein each director record represents one director, each director record comprising a director identification.

13. The system of claim 12 wherein each director record further comprises a director authority.

14. The system of claim 11 wherein:
the director attributes include director authority,
at least one director has administrative director authority, and
administrative director authority includes authority to edit the director instruction records.

15. The system of claim 11, wherein the director attributes include director authority, the system further comprising means for editing the director instruction records, wherein the means for editing is utilized through a director having administrative director authority.

16. The system of claim 11 wherein the director attributes comprise a director identity, wherein the director instruction records comprise a director instruction identity, and wherein means for extracting director instructions further comprises:
means for determining a director identity; and
means for extracting from the store of director instructions director instructions having director instruction identities equal to the director identity.

17. The system of claim 11, wherein the director instructions comprise URLs.

18. The system of claim 11, wherein the director instructions comprise URLs and anchors.

19. The system of claim 11 further comprising means for encoding the extracted director instructions into hyperlinks in an HTML document.

20. The system of claim 11 wherein means for downloading the extracted director instructions to the director comprises means for downloading an HTML document to the director.

21. A computer program product for assigning director authority for streaming digital content from a multiplicity of sources of digital information to a multiplicity of client devices under control of a multiplicity of directors, the system implemented in conjunction with a network of digital computers, at least one of the digital computers comprising a content server upon which the system is implemented in computer memory and upon at least one computer processor, each said director having director attributes, the director attributes comprising a director authority, the content server including a store of director instruction records wherein each said director instruction record represents one director instruction, the director instruction records comprising a director instruction authority, the system comprising:

a recording medium;

means, recorded on the recording medium, for extracting for a director, in dependence upon the director's attributes, director instructions from the store of director instruction records; and     means, recorded on the recording medium, for downloading the extracted director instructions to the director.

22. The computer program product of claim 21 further comprising means, recorded on the recording medium, for logging in a director to the content server and means, recorded on the recording medium, for determining the director's attributes, means for determining the director's attributes further comprising means for reading a store of director records wherein each director record represents one director, each director record comprising a director identification.

23. The computer program product of claim 21 wherein each director record further comprises a director authority.

24. The computer program product of claim 21 wherein:
the director attributes include director authority,
at least one director has administrative director authority, and
administrative director authority includes authority to edit the director instruction records.

25. The computer program product of claim 21, wherein the director attributes include director authority, the computer program product further comprising means, recorded on the recording medium, for editing the director instruction records, wherein the means for editing is utilized through a director having administrative director authority.

26. The computer program product of claim 21 wherein the director attributes comprise a director identity, wherein the director instruction records comprise a director instruction identity, and wherein means for extracting director instructions further comprises:
means, recorded on the recording medium, for determining a director identity; and
means, recorded on the recording medium, for extracting from the store of director instructions director instructions having director instruction identities equal to the director identity.

27. The computer program product of claim 21, wherein the director instructions comprise URLs.

28. The computer program product of claim 21, wherein the director instructions comprise URLs and anchors.

29. The computer program product of claim 21 further comprising means, recorded on the recording medium, for encoding the extracted director instructions into hyperlinks in an HTML document.

30. The computer program product of claim 21 wherein means for downloading the extracted director instructions to the director comprises means for downloading an HTML document to the director.

* * * * *